(12) United States Patent

Kuris et al.

(10) Patent No.: US 12,591,566 B2

(45) Date of Patent: Mar. 31, 2026

(54) COMPACTION-LESS DATABASE FOR STORING BLOCKCHAIN STATE

(71) Applicant: Ava Labs, Inc., New York, NY (US)

(72) Inventors: Ronald Dana Kuris, San Francisco, CA (US); Daniel Laine, Jersey City, NY (US); Stephen John Buttolph, Brooklyn, NY (US); Patrick Robert O'Grady, Palo Alto, CA (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 19/217,781

(22) Filed: May 23, 2025

(65) Prior Publication Data

US 2025/0363095 A1 Nov. 27, 2025

Related U.S. Application Data

(60) Provisional application No. 63/651,020, filed on May 23, 2024.

(51) Int. Cl.
| | |
|---|---|
| *G06F 16/23* | (2019.01) |
| *G06F 11/1446* | (2026.01) |
| *G06F 16/21* | (2019.01) |
| *G06F 16/22* | (2019.01) |

(52) U.S. Cl.
CPC ...... *G06F 16/2379* (2019.01); *G06F 11/1469* (2013.01); *G06F 16/219* (2019.01); *G06F 16/2246* (2019.01); *G06F 2201/80* (2013.01)

(58) Field of Classification Search
CPC ............. G06F 16/2379; G06F 11/1469; G06F 16/219; G06F 16/2246; G06F 2201/80; G06F 16/23; G06F 16/21; G06F 16/22
See application file for complete search history.

(56) References Cited

U.S. PATENT DOCUMENTS

| | | | |
|---|---|---|---|
| 11,256,720 B1 | 2/2022 | Hoffman | |
| 2003/0191743 A1* | 10/2003 | Brodersen | G06F 16/178 |
| 2011/0035376 A1 | 2/2011 | Kirshenbaum | |
| 2014/0164409 A1* | 6/2014 | Johnson | G06F 16/24561 |
| | | | 707/756 |

(Continued)

OTHER PUBLICATIONS

Ava Labs, Inc. (2023) Firewood: Compaction-Less Database Optimized for Efficiently Storing Recent Merkleized Blockchain State [Source code]. https://github.com/ava-labs/firewood.

(Continued)

*Primary Examiner* — Maher N Algibhah

(74) *Attorney, Agent, or Firm* — McDermott Will & Schulte LLP

(57) ABSTRACT

Various aspects of the subject technology relate to systems, methods, and machine-readable media for implementing a compaction-less database structure. Various aspects may include identifying nodes in a most recent revision of a database structure stored on disk corresponding to locations of node changes in a current proposal. Aspects may also include persisting node addresses for nodes that have changed from the most recent revision in the current proposal to a future-delete list (also kept on disk). Aspects may also include writing only the new nodes including a root node to disk. Aspects may also include updating a root address on disk based on the root node. Aspects may also include committing the proposal as a new revision of the database structure.

20 Claims, 10 Drawing Sheets

100

(56) References Cited

U.S. PATENT DOCUMENTS

| | | | |
|---|---|---|---|
| 2020/0311675 A1 | 10/2020 | Sankaran et al. | |
| 2021/0149767 A1 | 5/2021 | Edwards et al. | |
| 2021/0334236 A1 | 10/2021 | Wang et al. | |
| 2024/0005426 A1* | 1/2024 | Kamatani | G06Q 10/0637 |
| 2024/0265005 A1* | 8/2024 | Li | G06F 16/256 |

OTHER PUBLICATIONS

International Search Report and Written Opinion for International Patent Application No. PCT/US2025/030788, mailed Jul. 29, 2025 (10 pages).

* cited by examiner

400

500

<u>600</u>

<u>700</u>

Identifying a root and hash for a target revision — 702

Identifying all written delete lists on disk — 704

Searching for a most recent delete list that contains the root and hash from the database — 706

Creating a revision for each previous release from metadata on disk — 708

800

900

Computing Platform(s)  902

Electronic Storage 1226

Processor(s)  930

Machine-Readable Instructions  906

Proposal Processing Module     908

Commit Checking Module   910

Future-delete Tracker          912

Free Space Tracker             914

Deleting Module                916

Node Flushing Module          918

Recovery Module               920

Remote Platform(s) 904

150 NETWORK

External Resources 924

COMPACTION-LESS DATABASE FOR STORING BLOCKCHAIN STATE

CROSS REFERENCE TO RELATED APPLICATIONS

The present disclosure is related and claims priority under 35 U.S.C. § 119 (e), to U.S. Provisional Patent Application No. 63/651,020, entitled BLOCKCHAIN-OPTIMIZED DATABASE, to Ronald Dana Kuris et al., filed on May 23, 2024, the contents of which are hereby incorporated by reference in their entirety, for all purposes.

TECHNICAL FIELD

The present disclosure generally relates to a compaction-less database structure that eliminates writing amplifications. The compaction-less database structure is accomplished by storing a plurality of revisions on disk. Once a node for a revision is written once, it is flushed and never rewritten again. Instead, expired nodes are overwritten with new data and flushed to disk, sharing nodes from previous revisions and reusing parts of the database structure that are no longer referenced.

BACKGROUND

In the field of database solutions, the efficient storage and retrieval of data are critical for performance and reliability. One widely used data structure is the Merkle trie, which combines the properties of a Merkle tree and a trie to provide efficient and verifiable data integrity checks. However, storing Merkle trie data presents significant technical challenges, particularly regarding the redundancy of node writes. Current database systems often write nodes multiple times, leading to increased disk I/O and storage inefficiencies. This redundancy occurs in various scenarios, including the use of, for example, write-ahead logs (WAL) and log-structured merge (LSM) backend databases.

BRIEF SUMMARY

The subject disclosure provides systems and methods for providing a key-value store, optimized to store recent states in Merkle tries with minimal overhead by directly storing trie nodes on-disk.

According to embodiments, a computer-implemented method for implementing a compaction-less database structure is provided. The method includes receiving a proposal for a revision including a root hash reflecting one or more node changes in a data structure. The method also includes identifying nodes in a most recent revision of the data structure stored on disk corresponding to locations of the node changes. The method also includes persisting node addresses for the nodes in the most recent revision to a future-delete list. The method also includes flushing a root node based on the root hash and new nodes based on the node changes to disk. The method also includes updating a root address on disk based on the root node. The method also includes committing the proposal as a new revision of the data structure.

According to embodiments, a compaction-less database system is provided including a processor and a memory comprising instructions stored thereon, which when executed by the processor, cause the processor to perform operations to store recent Merkleized (for example, blockchain) states. The operations include receiving a proposal for a revision including a root hash reflecting one or more node changes in a data structure. The operations also include identifying nodes in a most recent revision of the data structure stored on disk corresponding to locations of the node changes. The operations also include persisting node addresses for the nodes in the most recent revision to a future-delete list. The operations also include flushing a root node based on the root hash and new nodes based on the node changes to disk. The operations also include updating a root address on disk based on the root node. The operations also include committing the proposal as a new revision of the data structure.

According to embodiments, a non-transitory computer-readable medium storing a program for implementing a compaction-less database structure, which when executed by a computer, configures the computer to receive a proposal for a revision including a root hash reflecting one or more node changes (for example, transactions on a blockchain) in a data structure. The program, when executed by a computer, further configures the computer to identify nodes in a most recent revision of the data structure stored on disk corresponding to locations of the node changes. The program, when executed by a computer, further configures the computer to persist node addresses for the nodes in the most recent revision to a future-delete list. The program, when executed by a computer, further configures the computer to flush a root node based on the root hash and new nodes based on the node changes to disk. The program, when executed by a computer, further configures the computer to update a root address on disk based on the root node. The program, when executed by a computer, further configures the computer to commit the proposal as a new revision of the data structure (for example, updating a state of the database structure).

These and other embodiments will become clear to one of ordinary skill in the art, in view of the following.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
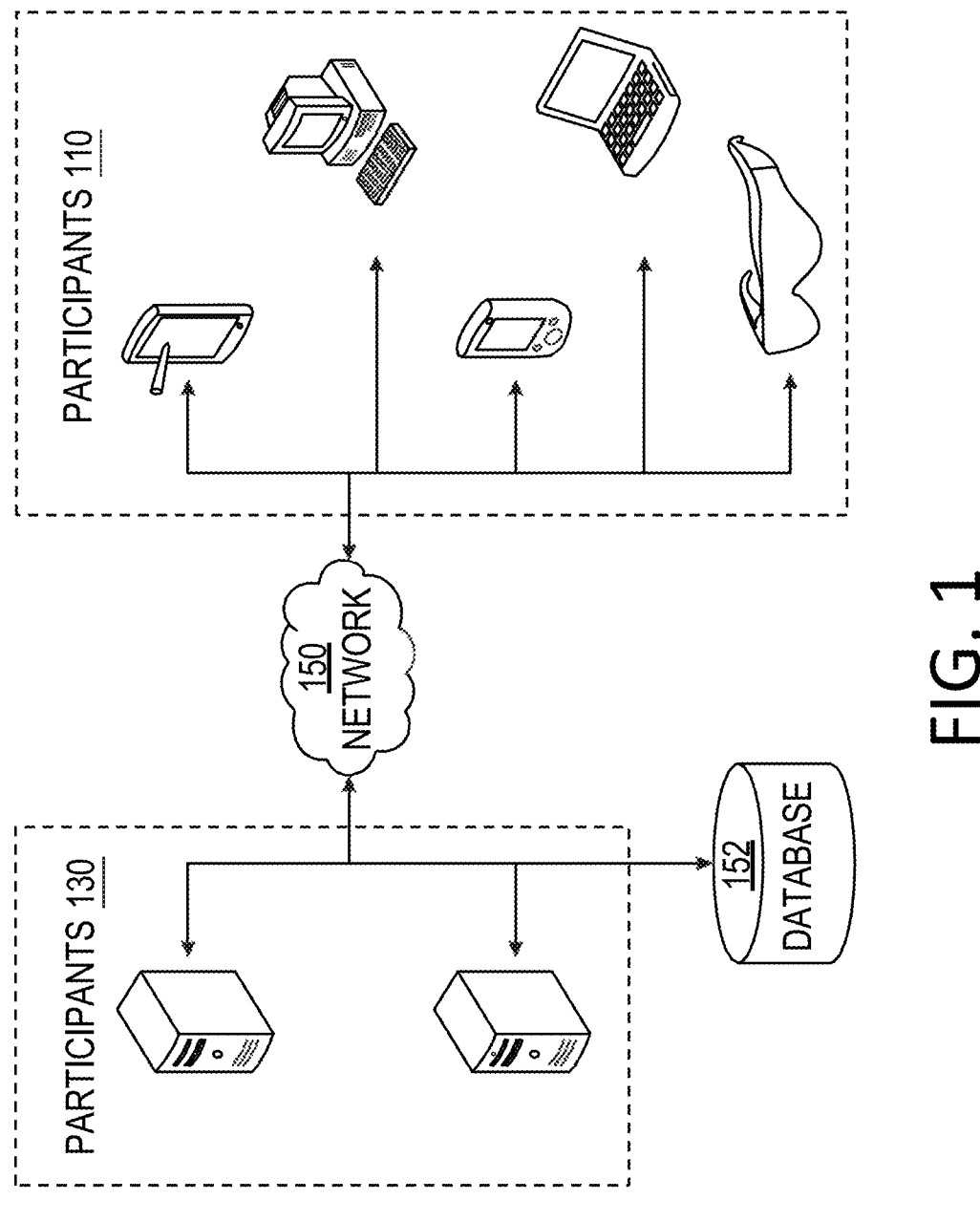
FIG. 1 is a block diagram of a device operating environment with which aspects of the present disclosure can be implemented.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions may be provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

General Overview

In the field of database solutions, the efficient storage and retrieval of data are critical for performance and reliability. One widely used database structure is the Merkle trie, which combines the properties of a Merkle tree and a trie to provide efficient and verifiable data integrity checks. Merkle tries also support versioning and state management, allowing different versions of the database state to be managed effectively. This feature is prominently used in blockchain technology, where each block can have its own Merkle trie representing the state at that point in time. Furthermore, Merkle tries are particularly useful in databases due to their ability to facilitate efficient data retrieval, quick lookups, insertions, and deletions. This makes them ideal for applications requiring fast access to specific data points. However, storing Merkle trie data presents significant technical challenges, particularly regarding the redundancy of node writes. Current database systems often write nodes multiple times, leading to increased disk I/O and storage inefficiencies. This issue is prevalent in systems utilizing write-ahead logs (WAL) and log-structured merge (LSM) backend databases.

Write-ahead logs are employed to ensure atomicity and durability by recording changes in a log before applying them to the database. This process can result in multiple writes of the same node, especially during recovery operations, thereby increasing the overall disk load. Similarly, LSM backend databases handle high write throughput by organizing data into multiple levels and periodically merging it from memory to disk. During these merge operations, Merkle trie nodes may be written multiple times, as existing data is read, merged with new data, and written back to disk. This repeated writing significantly increases disk usage and I/O operations, posing a substantial technical problem. Further, in traditional database systems, compaction is necessary to maintain the integrity and performance of the database.

Embodiments, as disclosed herein, provide a solution to the above-mentioned problems rooted in computer technology, namely, a compaction-less advanced database structure optimized for storing Merkleized states with minimal overhead. The database structure avoids the need for compaction by directly storing trie nodes on-disk and efficiently managing revisions and deletions, thus maintaining optimal performance without the overhead of periodic compaction tasks. Each Merkle trie node is only written once (that is, no write amplification). Instead, nodes may be overwritten if there is a change in the entry or if it is no longer needed (for example, marked for deletion), guaranteeing consistency of any known revision since the database structure is doing an in-place copy on write. This approach reduces the overall disk load by minimizing redundant writes, leading to improved performance and lower storage requirements. By ensuring each node is written only once and enabling the storage of node revisions, this solution optimizes both write-ahead logging and log-structured merge processes. New entries are always written to unused space in the file upon commit, enhancing the efficiency of database systems that store Merkle trie data.

The compaction-less database structure may store multiple revisions on-disk while keeping memory requirement low. A revision may include any historical point-in-time state/version of the trie. The revision represents the entire trie, including all key-values at that point in time, and all nodes. The database structure keeps memory requirements for historical revisions low by only keeping a root address and a list of node addresses that are no longer referenced by this or later revisions. Data may be kept on-disk until the old data is no longer referenced by any revision currently being tracked, providing guarantees for readability of old data. The database structure stores multiple Merkle tries where each of the Merkle tries can share data from nodes that are the same amongst them, reusing parts of an existing trie when the data is the same. As such, nodes are never compacted and only move if they are updated. This compaction-less nature ensures fast iteration without the need for periodic compaction to maintain the index.

According to embodiments, the compaction-less database structure may be optimized to store recent Merkleized blockchain states. The compaction-less database structure may provide a fast storage layer, for example, for any blockchain that requires an authenticated state.

The database structure is designed to store recent revisions and actively clean up unused data (for example, when revisions expire), maintaining a configurable number of previous states in memory and on-disk. By having the revisions include all the key-value pairs, effectively combining a standard key-value store and Merkle tree structure into a single Merkle trie, the need for state synchronization is eliminated, effectively reducing system load. That is, trie nodes may be directly stored on-disk and directly use the trie structure as the index on-disk. This eliminates the need for emulating the logical trie to fit into an underlying database that is unaware of the data being stored, thereby enhancing performance and efficiency. This compaction-less nature ensures fast iteration (for example, for serving state sync queries) without the need for periodic compaction to maintain the index.

In some embodiments, recent revisions may be defined based on one or more attributes including, but not limited to, time, a predetermined number of operations and/or batches (for example, a set of batch operations—each batch operation comprising either a put or delete operation) in the Merkle trie, etc. Operations may include, for example, put, delete, and commit operations. A put operation may be used to add a value for a specific key—creating a key-value pair if it does not exist or update an existing key-value pair if it does. A delete operation may indicate that a key should be removed from the Merkle trie (for example, a deleted entry for an oldest revision). A commit operation may be used to apply one or more proposals to the most recent revision. According to embodiments, a proposal may consist of a base root hash and a batch, but is not yet committed to the Merkle trie.

According to embodiments, a configurable number of previous states may be kept in memory and on-disk to power state syncs. A state sync may occur at a preset number of roots behind a current state. To do this, a new root is created for each revision that can reference either new nodes from a current revision or nodes from a prior revision. When creating a revision, a list of nodes that are no longer needed are computed and saved to disk, for example, in a future-delete log (FDL) as well as kept in memory. The FDL is used to track nodes that need to be deleted, ensuring efficient space management. When a revision expires, nodes that were deleted are returned to free space and can be reused. This avoids the need for additional writes and space allocation, further reducing costs. Accordingly, the compaction-less database structure is able to guarantee recoverability by ensuring new nodes are flushed to disk before being referenced in new revisions and carefully managing the free list during the creation and expiration of revisions.

Example System Architecture

FIG. 1 illustrates a network architecture 100 used to implement a blockchain framework for practical and compliant on-chain privacy. Specifically, in this example, the network architecture 100 provides a blockchain implementation of compaction-less database used for storing merkleized states in blockchain technology, according to some embodiments.

In the example of FIG. 1, the network architecture 100 includes one or more participants 110 and one or more participants 130 which are communicatively coupled through a network 150. The network 150 may include a wired network (e.g., via fiber optic or copper wire, telephone lines, and the like) and/or a wireless network (e.g., a satellite network, a cellular network, radiofrequency (RF) network, Wi-Fi, Bluetooth, and the like).

Network 150 may further include one or more of a local area network (LAN), a wide area network (WAN), the Internet, and the like. Further, the network 150 may include, but is not limited to, any one or more of the following network topologies, including a bus network, a star network, a ring network, a mesh network, and the like.

The participants 110 may include any one of a laptop computer, a desktop computer, or a mobile device such as a smart phone, a palm device, a tablet device, a television, a wearable device, a display device, or other device with sufficient computational, storage, and communication resources to execute software implementing various aspects of embodiments and that can be stored in a memory of the device. The participants 110 may be clients of the blockchain framework for creating, expanding, or otherwise modifying customized blockchain networks and/or private or public subnets. The participants 110 may comprise a plurality of nodes for a blockchain network. A node for a blockchain network may comprise an application or other software that records and/or monitors peer connections to other nodes and/or miners for the blockchain network. The nodes may continually record the state of the blockchain and respond to remote procedure requests for information about the blockchain. Aspects of a transfer protocol may be implemented at the node level, as part of a blockchain client software.

In some embodiments, the participants 130 may be a cloud server or a group of cloud servers. In other embodiments, some or all of the participants 130 may not be cloud-based servers (i.e., may be implemented outside of a cloud computing environment, including but not limited to an on-premises environment), or may be partially cloud-based. Some or all of the participants 130 may be a computing device such as part of a cloud computing server including one or more desktop computers or panels mounted on racks, and/or the like. The panels may include processing boards and also switchboards, routers, and other network devices. In some embodiments, the participants 130 may include the participants 110 as well, such that they are peers.

The participants 110 and/or the participants 130 may function as nodes for one or more blockchains implemented on the network architecture 100. As an example, the participants 110 and/or the participants 130 may themselves be, or may execute, virtual machines (VMs) that function as nodes of one or more blockchains, and accordingly run software to verify block and transaction data, store data, validate, respond to network requests for data, execute smart contracts, and/or the like for their respective blockchain(s). The VMs may be computers that run on blockchains and allow smart contracts from multiple sources to interact with one another.

As a non-limiting example, multiple participants 110 may have access to at least one blockchain network hosted by the participants 130. As another non-limiting example, the participants 130 may provide services such as Internet based services including web2 services and web3 services, for example, to the participants 110.

The participants 130 may store blockchain data in a peer-to-peer (P2P) and/or distributed ledger fashion in a database 152. Database 152 may be a single database or a distributed database. The database 152 may store relevant information including, but not limited to, a shared registry, execution and verification logic, and/or rules for implementing consensus, messaging protocols, state tracking mechanisms, etc.

The participants 130 may be configured to concurrently implement multiple blockchains of different types, including but not limited to an asset blockchain (e.g., for creating new assets, asset exchange, cross-subnet transfers), a metadata blockchain (e.g., for coordinating validators, tracking active subnets, and creating new subnets), and a smart contract blockchain (e.g., for creating smart contracts and applications that require total ordering).

Figure 2:
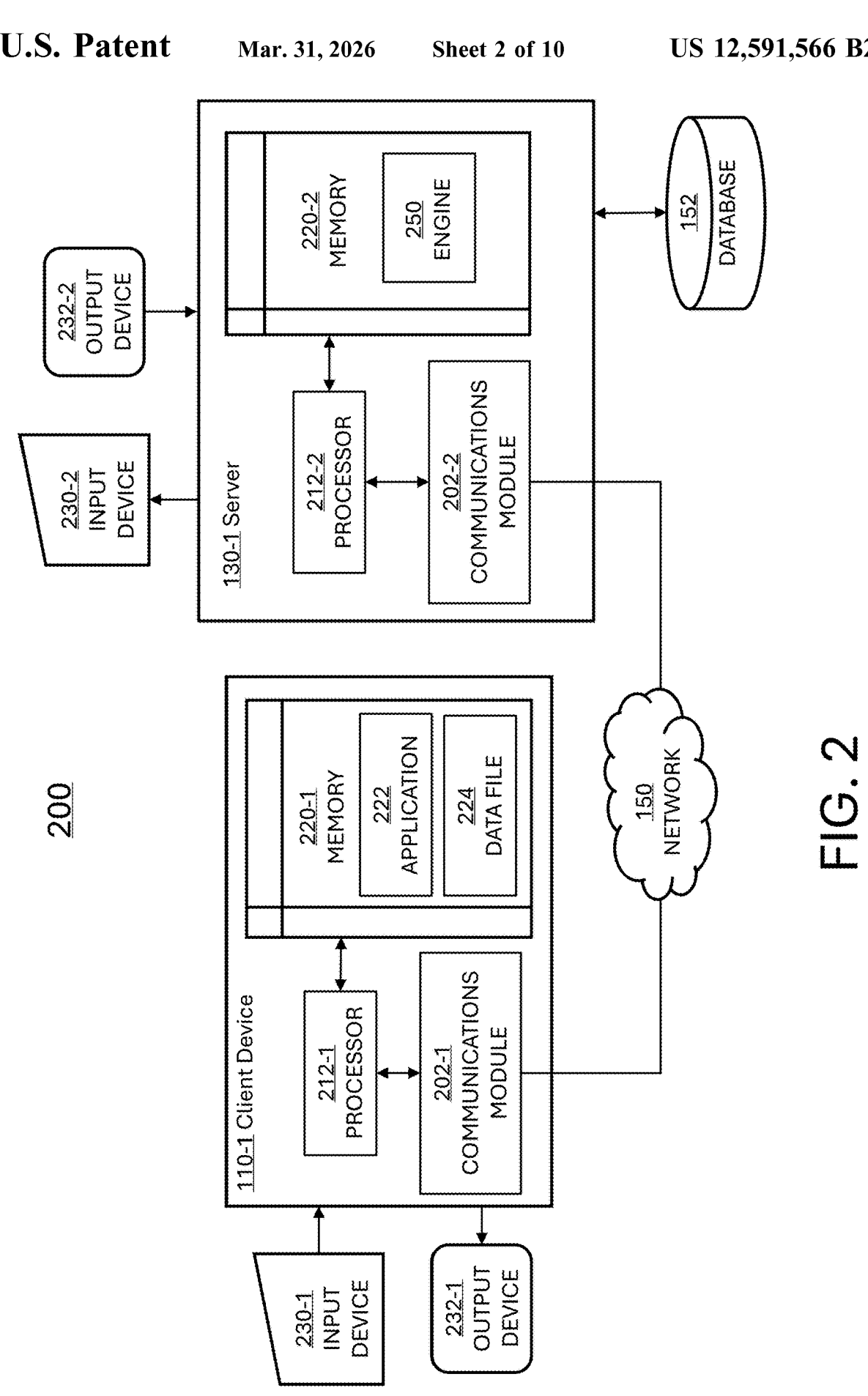
FIG. 2 is a block diagram illustrating details of devices used in the architecture of FIG. 1, according to certain aspects of the present disclosure.

FIG. 2 is a block diagram illustrating details of devices used in the architecture of FIG. 1, according to some embodiments. Specifically, the example of FIG. 2 illustrates an exemplary participant 110-1 (of the participants 110) and an exemplary participant 130-1 (of the participants 130) of the network architecture 100 of FIG. 1. The system 200 may implement compaction-less merkleized state storing algorithms and protocols for blockchain-related consensus or messaging for any subnet or blockchain executing on the network architecture 100.

The participant 110-1 and the participant 130-1 access each other and other devices in the network 150 via corresponding communications modules 202-1 and 202-2, respectively. For example, participant 110-1 and participant 130-1 may be connected by wired or wireless means to the Internet and support communication with a blockchain distributed ledger with smart contract support, such as Ethereum, via communications modules 202-1 and 202-2. Other embodiments may use different blockchains or non-blockchain based embodiments may also have utility in some circumstances.

The communications modules 202-1 and 202-2 can be, for example, modems or Ethernet cards, and may include radio hardware and software for wireless communications (e.g., via electromagnetic radiation, such as radiofrequency (RF), near field communications (NFC), Wi-Fi, and Bluetooth radio technology). The participant 110-1 and participant 130-1 also include a processor 212-1, 212-2 and memory 220-1, 220-2, respectively. Communications modules 202-1 and 202-2, processors 212-1 and 212-2, and memories 220-1 and 220-2 will be collectively referred to, hereinafter, as "communications modules 202," "processors 212," and "memories 220." Processors 212 may be configured to execute instructions stored in memories 220, to cause participant 110-1 and/or participant 130-1 to perform methods and operations consistent with embodiments of the present disclosure.

The participant 110-1 and the participant 130-1 are coupled to at least one input device 230-1 and input device 230-2, respectively (hereinafter, collectively referred to as "input devices 230"). The input devices 230 can include a mouse, a keyboard, a pointer, a stylus, a touchscreen, a microphone, voice recognition software, a joystick, a virtual joystick, a touch-screen display, and the like. The participant 110-1 and the participant 130-1 are also coupled to at least one output device 232-1 and output device 232-2, respectively (hereinafter, collectively referred to as "output devices 232"). The output devices 232 may include a display (e.g., a same touchscreen display used as an input device), a speaker, an alarm, and the like. A user may interact with participant 110-1 and/or participant 130-1 via the input devices 230 and the output devices 232.

The participant 110-1 can implement and/or manage the blockchain framework described herein by executing application 222 executing within memory 220-1 and couple with input devices 230 and output devices 232. The application 222 may be downloaded by a user from participant 130-1, and/or may be hosted by participant 130-1. The application 222 includes specific instructions which, when executed by processor 212-1, perform operations consistent with embodiments of the present disclosure.

In some embodiments, the application 222 runs on an operating system (OS) installed on participant 110-1. In some embodiments, application 222 may run within a web browser, wallet, finance application, or the like. In some embodiments, the processor 212-1 is configured to control a graphical user interface (GUI) (spanning at least a portion of input devices 230 and output devices 232) for the user of participant 110-1 to access participant 130-1. According to some embodiments, application 222 may include encryption and decryption schemes which can be downloaded and installed in participant 110-1. Various aspects of the encryption and decryption schemes may be implemented in software executed by the user devices. By non-limiting example, the software may make use of existing smart wallet functionality available on participant 110-1. Other functionality may be implemented remotely, such as, for example, in the context of smart contracts executed by devices supporting the blockchain transaction ledger.

Data and files associated with the application 222 may be stored in a local data file 224 stored in memory 220-1, a local database of participant 110-1 or participant 130-1, or an external database (e.g., database 152, a distributed database, and the like). The participant 110-1 may be used by a user of the blockchain framework to perform blockchain functions including, but not limited to, message transfer, exchange transactions, blockchain validation, smart contract registration, block proposal, and the like. According to some embodiments, the data and files from operations within the blockchain framework may be stored in a compaction-less database storing merkleized states of the blockchain.

In some embodiments, memory 220-2 includes a blockchain engine 250. The blockchain engine 250 may be configured to perform methods and operations consistent with embodiments of the present disclosure. The blockchain engine 250 may share or provide features and resources with a client device, including data, libraries, and/or applications retrieved with blockchain engine 250 (e.g., application 222). The user may access the blockchain engine 250 through the application 222. Application 222 may be installed in participant 110-1 by participant 130-1 and perform scripts and other routines provided by participant 130-1. According to embodiments, the blockchain engine 250 may include, but is not limited to, an encryption component configured to implement a compaction-less database system (for example, compaction-less database system 900 described with reference to FIG. 9).

System Framework

Figure 3:
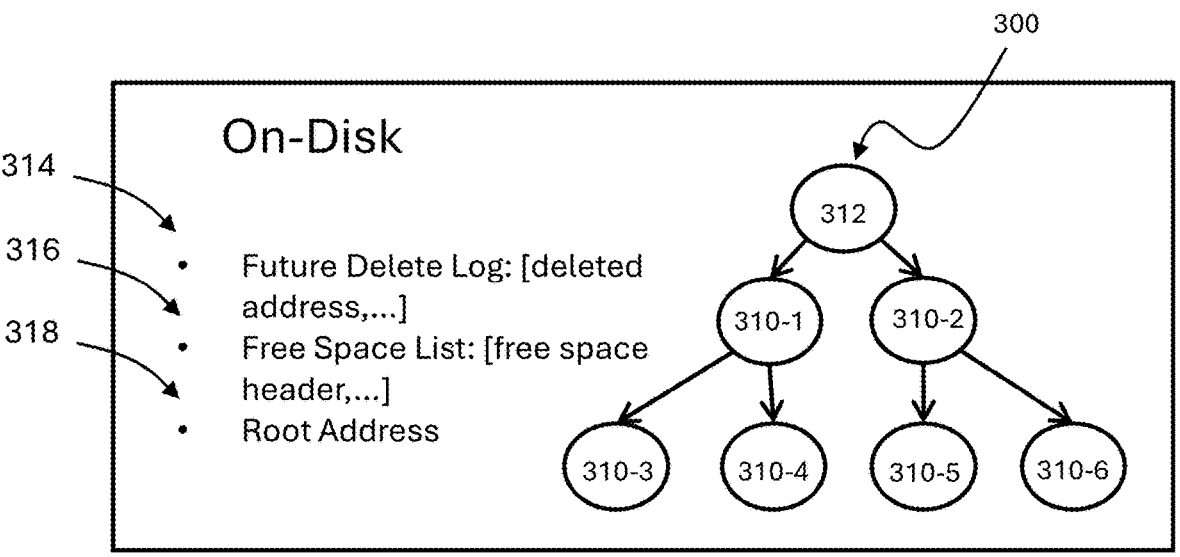
FIG. 3 is an exemplary Merkle trie structure used for implementing a compaction-less database structure, according to certain aspects of the present disclosure.

FIG. 3 is an exemplary Merkle trie 300 used for implementing a compaction-less database structure, according to one or more embodiments. The Merkle trie 300 is a database structure that stores key-value pairs. The Merkle trie 300 may correspond to a revision as described according to embodiments. Nodes 310-1, 310-2, 310-3, 310-4, 310-5, and 310-6 (hereafter referred to as nodes 310) each represent a portion of the Merkle trie 300. Nodes 310 may contain key-value pairs. Root node 312 is a representation of the Merkle trie 300. Root node 312 may be included in a block header, serving as a compact representation of all transactions in that block (that is, all nodes in the trie).

As shown in FIG. 3, nodes 310 may be linked together. Nodes 310 may point to other nodes and/or contain key-value pairs. The key may represent an individual byte array used to index into a trie. A value may represent a byte array for the value of a specific key. The values may contain 0-N bytes, with zero-length values being valid.

According to embodiments, the Merkle trie 300 structure may consist of several types of nodes including, for example, empty nodes, branch nodes, leaf nodes, and extension nodes. Cryptographic hashing may be used to ensure data integrity in the Merkle trie 300 by hashing each of the nodes 310 and storing the hash values. The root hash is a cryptographic hash of the root node for a specific revision (for example, Merkle trie 300). The root hash serves as a unique identifier for the entire trie and ensures data integrity, as any modification to the data results in a different root hash. According to embodiments, each of the nodes 310 have a corresponding hash and an address that refers to the location of the node on disk (that is, the disk address or disk offset of the node). The root address 318 and the root hash (that is, the hash value of root node 312) are stored on-disk. Given the root hash represents a specific revision, only the root address is kept in memory, significantly reducing memory usage and cost for keeping revisions.

Free space headers 316 are persisted to disk. In some implementations, the future-delete log 314 may be persisted to disk. FDL 314 may include a list of addresses of nodes that are no longer needed, can be deleted, and/or are deleted from the Merkle trie 300. When committing a proposal, the future-delete log 314 should be fully flushed to disk, ensuring that all nodes slated for deletion are recorded and can be recovered. The free space list 316 may include a list of free space headers. The free space list 316 is critical for managing available and reusable space on-disk. Free space list 316 may be flushed to disk to reuse free space freed by previously reaped proposals.

This comprehensive management of the future-delete log 314 and free space list 316 ensures efficient space utilization, recoverability, and the integrity of the database structure. For example, if a device or memory crashes, the future-delete log 314 and free space list 316 may be used to recover information on the Merkle trie 300 from disk using just the root address which is stored in memory.

Figure 4:
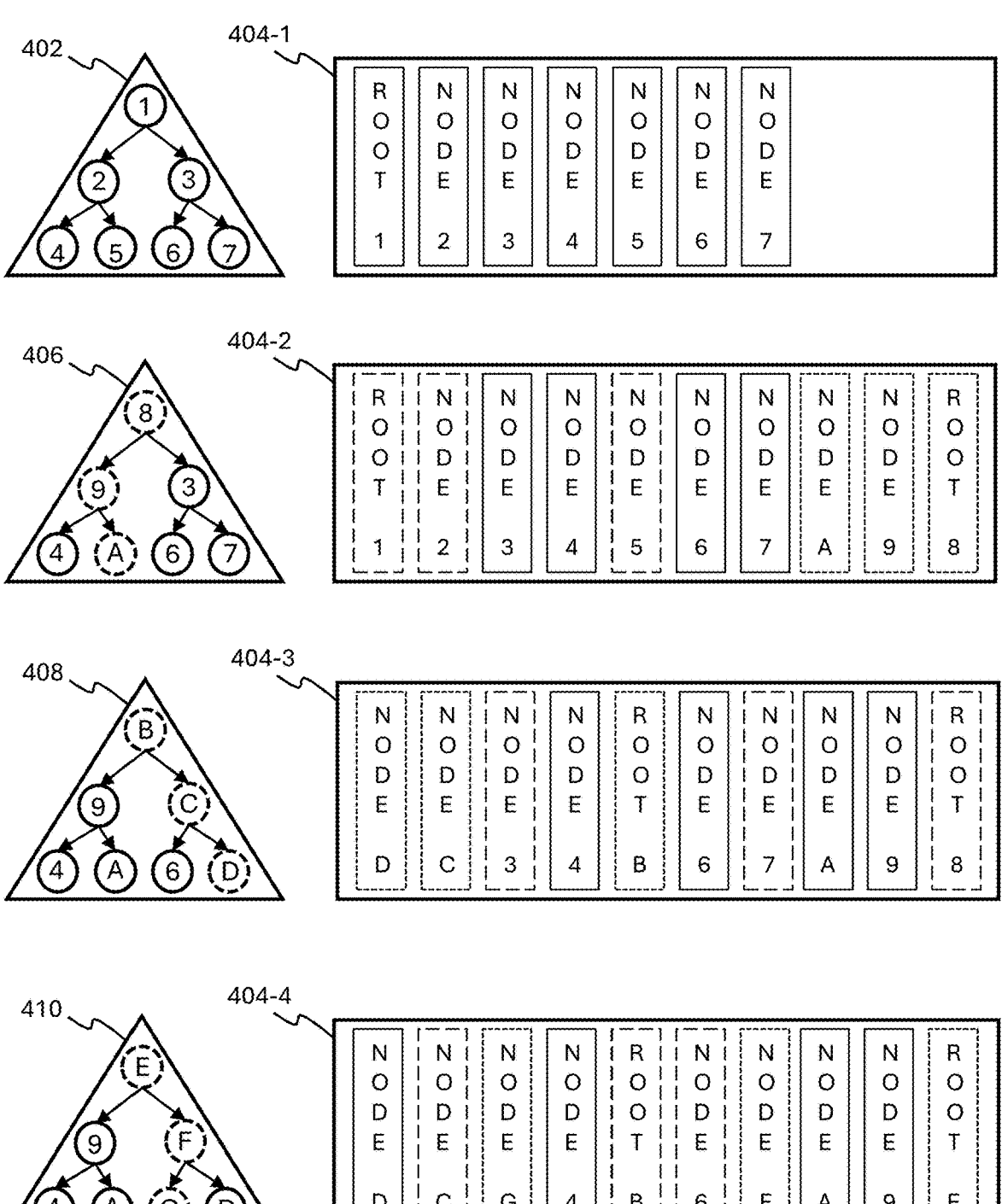
FIG. 4 is an illustration of a transition between states of a Merkle trie in a compaction-less database structure, according to certain aspects of the present disclosure.

FIG. 4 is an illustration of a transition between states of a Merkle trie (similar to Merkle trie 300) in a compaction-less database structure 400, according to one or more embodiments. Each state represents a revision of the Merkle trie and tracks changes in the database structure, allowing for efficient verification and retrieval of information. In some embodiments, nodes in the Merkle trie may represent various pieces of the state of a blockchain including, but not limited to, account balances, smart contract codes, and/or other state data.

The revisions may be stored in a file on-disk (for example, disk 404). One or more revisions may share a portion of data which are reused amongst the revisions. In this manner, a node that has been written once in any existing revision, will not be written again. This optimizes disk usage by eliminating collection and storage of unnecessary data. This also means that once nodes are written, they are immutable. Node addresses may be assigned to nodes at the time they are written to disk. Embodiments describe revisions or a set of recent revisions being stored on-disk, however, are not limited to this. In some implementations, one or more revisions (for example, intermediate revisions within a predetermined time frame) may not be stored on-disk.

According to embodiments, each committed revision may store, on-disk, at least a root address, root hash, nodes (of the Merkle trie), and deleted node addresses maintained in a future-delete log (not shown in FIG. 4). In some embodiments, each committed revision may store free space headers for space that no revision is claiming, which is tracked in a free space list. According to embodiments, any change in a node in the Merkle trie constitutes a revision. This will also result in a new root hash as the root hash tracks and uniquely identifies the entire trie. As such, a new root is added for each revision, which may modify the free list and the delete list. The root may reference new nodes from the current revision and (unchanged) nodes from a prior revision. A root address for each of the revisions may be stored in memory and on-disk.

According to some embodiments, one or more nodes from the current revision may be marked for deletion and added to the future-delete log. In some implementations, nodes that have changed in a current revision are marked for deletion and can be overwritten in any subsequent revision. In some implementations, nodes are marked for deletion based on recency. By non-limiting example, after a node is kept for a configurable preset number of revisions, the node is scheduled for deletion. The roots, free space list, and future-delete log may be stored separately on disk (for example, in different files). Using the roots and the free space list (which are kept for every commit), revisions can be recovered. As such, all revisions (tracking changes in nodes) can easily be recovered from disk using the root address maintained in memory.

As shown in FIG. 4, a Merkle trie 402 of the initial state and revision 406, revision 408, and revision 410 each include a root node (labeled 1, 8, B, and E, respectively) and six additional nodes for each revision are stored on-disk. New nodes in a revision may be written to disk and/or replace an existing node address on disk. When a change is made to one or more of the nodes in a previous revision, a new revision is created. The new revision reflects the changes made to specific parts of the previous revision. Nodes of the previous revision that have changed may be overwritten or replaced by values from new nodes, forming the new revision corresponding to a most current state of the Merkle trie without any write amplification. That is, only the new nodes are written to disk and unchanged nodes from previous revisions are maintained for the new revision. The new revision is then stored on disk, ensuring that it can be recovered later and that the latest state of the database structure 400 is accurately represented.

Merkle trie 402 is the initial state and includes a root node 1, node 2, node 3, node 4, node 5, node 6, and node 7 which are all stored on disk 404-1 (a state of the disk 404 at a specified time). A proposal (for example, one or more transactions in a blockchain) may be prepared indicating a change in node 5 and node 2 in Merkle trie 402 to node A and node 9, respectively. As described, every update will write a new root node, and that new root address will be stored within the proposal. The change/update to node A and node 9 results in a new root node 8, resulting in the first revision 406. Between Merkle trie 402 and revision 406, node 3, node, 2, node 6, and node 7 maintain the same values. Therefore, the data for node 3, node, 2, node 6, and node 7 are shared between Merkle trie 402 and revision 406. The data from the shared nodes are not duplicated or rewritten on-disk for revision 406.

According to some embodiments, the address (on disk 404) for nodes that have changed may be scheduled for deletion and added to the future-delete log (tracking addresses of deleted nodes) which is also kept on-disk. As such, when a node is updated in a proposal (for example, node 5 is updated to node A), the old node (that is, node 5) is marked as deleted and added to the future-delete log in the proposal. However, it is not added to the free space list yet. The node is only added to the free space list when the revision that deleted or updated the node has expired and is reaped from disk. Accordingly, once the node is no longer referenced by any revision, it is then logically removed. In FIG. 4, nodes that are marked for deletion in the future-delete log are indicated using long dashed lines. By non-limiting example, node 5, node 2 and root node 1 from Merkle trie 402 are marked for deletion and added to the future-delete log. A new revision is created (that is, revision 406) including the new node A, node 9, and root node 8. The new nodes may be stored in memory or flushed to disk and the old nodes (marked for deletion) are saved in memory and added to the future-delete log.

According to embodiments, the free space list may track available and/or free allocated space on-disk. The free space list may be relied on when writing new nodes to disk. In some implementations, a new block may be allocated from the free space list. The free space list may comprise a pool of free space pointers for disk address from the proposal's parent that have free space. In some implementations, the new nodes (represented by short dashed lines in the example of FIG. 4) may be written to disk (as shown in disk 404-2) based on free space headers stored in the free space list. For example, at the initial state, the disk 404 has available space (as shown in disk 404-1) for new nodes. As such, new nodes included in revision 406 may be written to disk 404-2 rather than, for example, overwriting old/existing node addresses. Embodiments are not limited to this, and additional embodiments will be apparent from the present disclosure.

According to embodiments, nodes that are no longer referenced by the current state are tracked on disk using the future-delete log—making recovery of revisions easy using just the address of the root node stored in header. Any previous revision may be recovered as long as the location of the root for the specific revision is known. Nodes scheduled for deletion may be referenceable in a current revision so long as they have not been deleted. That is, while data marked for deletion from a previous revision is still stored on-disk, the current revision cannot reference the data without knowledge of the root address in the previous revision. By non-limiting example, revision 406 cannot directly reference root node 1, node 2, or node 5 as the data was removed and added to the future-delete log. However, the data that is unchanged (for example, node 3, node, 2, node 6, and node 7) is shared between revisions and is therefore referenceable by revision 406.

A proposal for another change may be processed, updating node 7 and node 3 in revision 406 to node D and node C, respectively. The change in the two nodes results in a new root node B and a second revision 408. The nodes that have changed are included in the second revision 408 and data for nodes between revisions (including the initial state) that have stayed the same are reused in revision 408. Further, given node 3, node 7, and root node 8 have changed in revision 408, they may be marked for deletion and added to the future-delete log.

According to some embodiments, the new nodes may overwrite one or more nodes that have expired. Overwriting operations may rely on the free space list and the future-delete log. In some implementations, the free space list is first referenced to determine if there are free spaces available on disk for the proposal. In some implementations, the future-delete log is then analyzed to determine which nodes (if any) can be deleted and replaced. According to embodiments, a revision may be deleted after N revisions are committed. When a revision is deleted, nodes from the revision are deleted and returned to free space (for example, added to the free space list). As such, the deleted revision is no longer available or referenceable on disk. The nodes returned to free space may be reused for new nodes. By non-limiting example, root node 1, node 2, and node 5 may be deleted based on meeting a certain criterion (for example, delete after N revisions). The deleted node address corresponding to root node 1, node 2, and node 5 may then be replaced with node addresses of the new nodes-overwriting root node 1, node 2, and node 5 with new node D, node C, and root node B, respectively, and creating revision 408 which is then flushed to disk (as shown in disk 404-3). According to embodiments, the new nodes may not be referenced in the new revision until the new nodes are flushed to disk, ensuring recoverability of those at a later time.

Embodiments are not limited to any specific order of node address overwriting. Any combination of node address replacements reasonably understood by one of ordinary skill in the art would be feasible (for example, overwriting root node 1, node 2, and node 5 with new root node B, node D, and node C, respectively, or overwriting root node 1, node 2, and node 5 with new node D, root node B, and node C, etc.). Further, in the example of FIG. 4, nodes are deleted after N=2 revisions. However, it may be understood by one of ordinary skill in the art that N can be any number configurable based on implementation.

As shown in FIG. 4, another proposal may change node 6, node C, and root node B from revision 408 to new node G, node F, and root node E resulting in revision 410. Accordingly, node 6, node C, and root node B are scheduled for deletion and added to the future-delete log. In the example of FIG. 4, node 3, node 7, and root node 8 (added to the future-delete log in a previous revision) are expired and moved to the free space list. Accordingly, revision 406 is no longer available. As such, new node G, node F, and root node E may overwrite deleted node 3, node 7, and root node 8 as shown in disk 404-4.

According to some embodiments, once nodes are added to the future-delete log, the nodes may be deleted based on criteria including, but not limited to, a number of revisions, file size, memory pressure, a duration of time nodes have been kept on disk, when nodes were last referenced, available disk space, etc. In some implementations, nodes are expired when they are no longer needed (for example, the associated revision is deleted). In some embodiments, only recent (for example, a preset number of) revisions are maintained on disk or in memory at a given time. Accordingly, a configurable number of previous states (N revisions) may be kept in memory and on disk.

In some embodiments, if a user is actively reading one of the existing revisions, such as the oldest revision among the N revisions, deleting that revision may be deferred until the user has finished. This ensures that data currently in use is protected from deletion, even if the nodes and/or revisions have expired while in use. When nodes are deleted, they can be reused for committing a next revision. In some embodiments, all nodes are reused in the next revision, leaving the free space list empty. However, if a revision deletes more nodes than it adds in a subsequent revision, the remaining nodes are kept on the free space list. By non-limiting example, in revision 406, there are three nodes (that is, nodes 1, 2, and 5) from the previous revision (that is, Merkle trie 402) that are scheduled for deletion and added to the future-delete list. If the previous revision is deleted, the nodes 1, 2, and 5 can be reused. If the next revision only requires one node slot (for example, overwriting root node 1), the remaining nodes (that is, nodes 2 and 5) are kept in the free list for future use. Accordingly, each revision does not require the use of all the nodes in the free space list.

According to some embodiments, every update of a node (that is, a new node) does not overwrite an existing node on-disk. In some embodiments, new space allocations are made on-disk to commit a new proposal when space is not available on disk. By non-limiting example, if revision 406 was not deleted at the time of proposal for revision 410, then new slots would be required for new node G, node F, and root node E. After revision 406 is deleted, the slots that previously stored node 3, node 7, and root node 8 may be replaced with new nodes for a subsequent revision (that is, subsequent to the deletion of revision 406).

In some implementations, a revision may delete fewer nodes than it adds in a subsequent revision, which would necessitate new space allocations for the remaining added nodes in memory. In other words, if a next revision adds four new nodes and a current revision only deletes three nodes, an additional slot must be allocated for at least one of the new nodes in the next revision. By non-limiting example, if only node 3 and node 7 in revision 408 were deleted and moved to free space and root node 8 did not expire, then root node 8 would stay on the future-delete log and on disk. Given this scenario, there is no available space to be used or reused on disk 404 for three new nodes in the proposal of revision 410. Therefore, two of the three new nodes would overwrite the two slots available (from deleted nodes 3 and 7) and a new space would be allocated (for example, for new root node E) in order to commit the proposal of revision 410.

In some implementations, if the free space list is empty (meaning there are no currently available slots for a new node) and none of the node addresses on the future-delete list have expired, additional space is needed to store the new node from the current proposal. This new space allocation would incur additional disk writes as it allocates new memory, for example, at the end of the file on-disk. By non-limiting example, the current proposal may include updates to node 6, node C, and root node B resulting in new node G, node F, and root node E, respectively, making up revision 410. If the free space list is empty and none of the node addresses in the future-delete log have expired (and thus have not been deleted), new space may be allocated for the new nodes.

Figure 5:
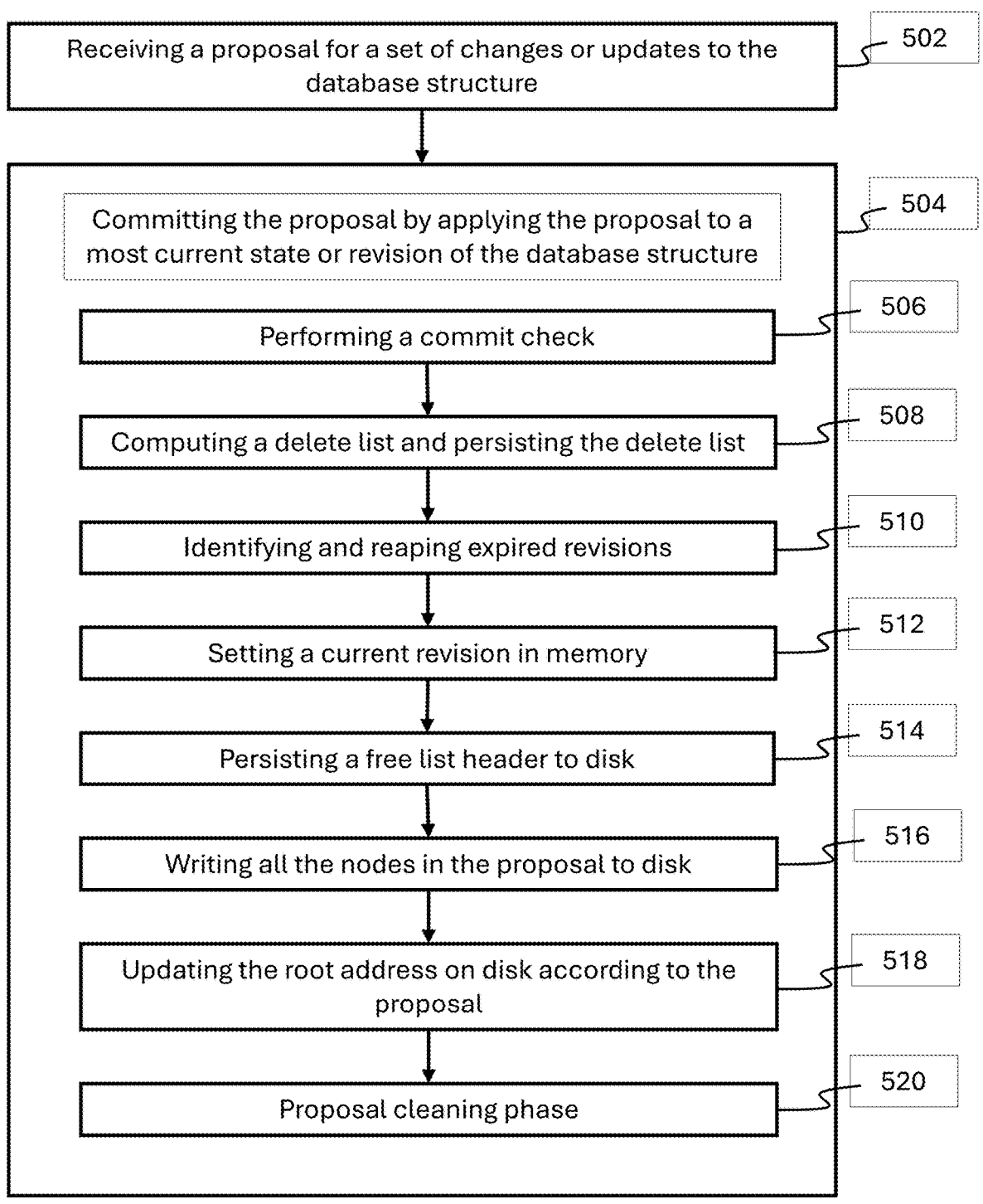
FIG. 5 is an exemplary workflow illustrating a process for committing revisions in a compaction-less Merkle trie database structure, according to certain aspects of the present disclosure.

FIG. 5 is an exemplary workflow illustrating a process 500 for committing revisions in a compaction-less Merkle trie database structure, according to aspects of embodiments. According to embodiments, new revisions may be committed to disk based on new proposals. The proposals may be required to commit the new revisions to disk.

At operation 502, process 500 may include generating a proposal for a set of changes or updates to the database structure. The proposal may include at least a root hash (corresponding to a root node) representing the set of changes and an ordered set of operations based on the set of changes. The set of changes may include one or multiple node value changes. That is, the proposal may include at least one or more updated nodes from a parent proposal.

According to some embodiments, preparing the proposal may include an operation for creating a new node. Process 500 may include executing the create node operation by searching a free space list for a current proposal, which originally was the free space from its parent proposal. If the parent proposal is a committed revision, then the free list starts from what is on disk.

According to some embodiments, preparing the proposal may include a delete node operation at a given address. The process 500 may include executing the delete node operation by adding the given address to a future-delete log for the proposal. According to some embodiments, preparing the proposal may include a node update operation. Process 500 may include executing the node update operation by initiating the node creating operation to create a new node and the delete node operation for the old node (that is, adding the address of the node to be deleted to the future-delete log).

According to some embodiments, preparing the proposal may include a read node operation implemented using a root address. The root address defines the top of the Merkle trie and may be used for read operations on any proposal. According to some embodiments, preparing the proposal may include an operation for setting the root node address. The root address of the proposal will always be different from prior revisions, assuming there are any operations in the proposal that mutate the trie.

At operation 504, process 500 may include committing the proposal by applying the proposal to a most current state or revision of the Merkle trie (for example, a state of files or changes made to them) on disk. To commit the proposal, process 500 may include executing operations 506-520.

At operation 506, process 500 may include performing a commit check. The commit check determines whether the parent proposal is the last committed revision on disk. If the parent proposal is not the last committed revision, the commit for the proposal fails.

At operation 508, process 500 may include computing a delete list and persisting the delete list (for example, to the future-delete log) to disk. The future-delete log may include delete lists for previous revisions in the database structure. The address of the root node and the root hash may also be persisted. The delete list, the root node, and the root hash may be persisted to a single file or a set of files. The delete list may include a list of all nodes that are no longer needed based on the proposal (for example, nodes that are changing in the proposal). The delete list may only contain the address of the nodes that are changed in this proposal. The delete list must be fully flushed to disk, scheduling the (changed) nodes for deletion. At operation 510, process 500 may include identifying and reaping expired revisions. In some implementations, a revision is expired after N revisions. Therefore, only a maximum of N revisions may be kept in memory and the oldest revision may be removed. Embodiments are not limited to this and may include other implementations for expiring revisions reasonably within scope of the present disclosure.

At operation 512, process 500 may include may include atomically setting a current revision in memory to the last committed revision based on the proposal. The current revision is the union of previous revisions and the set or changes or operations from the proposal. According to embodiments, another commit may start after this (operation 512), but before a node flush (for example, operation 516) is completed, further maximizing the efficiency of the process.

At operation 514, process 500 may include persisting a free list header, maintained in memory, to disk. According to embodiments, the free list header is persisted in a single write. This is feasible because the free list headers are small and must be persisted to disk before proceeding to the next step. According to some embodiments, the free list may be proven to be correct using one or more verification techniques (for example, using a periodic consistency check). In some implementations, the verification may be performed at every proposal, every M (configurable number) proposals, or the like.

At operation 516, process 500 includes writing (or persisting) all the nodes in the proposal to disk. This stores a new revision representing a current state, based on the proposal, of the database structure on-disk. The free list is flushed first to reuse free space freed by previously reaped proposals. Since the nodes persisted in operation 514 are all freshly allocated nodes, they will never be referred to by any prior commit. After flushing all the nodes, the file should be flushed to disk. As such, the file contains nodes from all known revisions stored on disk.

At operation 518, process 500 includes updating the root address on disk according to the proposal. This may include moving the root address for a last revision on disk and writing the root address from the proposal. In some implementations, this write may be delayed, but recovery of the last revision will not roll forward to this revision. Note that the last revision is the current revision for the database structure until the proposal commit is complete. After the commit is complete, the proposal becomes the current revision.

At operation 520, process 500 includes a proposal cleaning phase wherein proposal specific fields are cleared as they are no longer needed and any proposals that are not valid are removed from memory. That is, the new nodes and the free space list have both been flushed to disk. Therefore, the nodes may be cached, but are no longer owned by the proposal and can be read directly from the associated parent. The proposal cleaning phase may include removing other proposals made the same time as the current proposal. Since the state can only change once at a specified time, only one proposal will commit, and any remaining proposals at that specified time will be cleaned as they are invalid. In some implementations, aspects of the proposal cleaning phase may be configurable.

Figure 6:
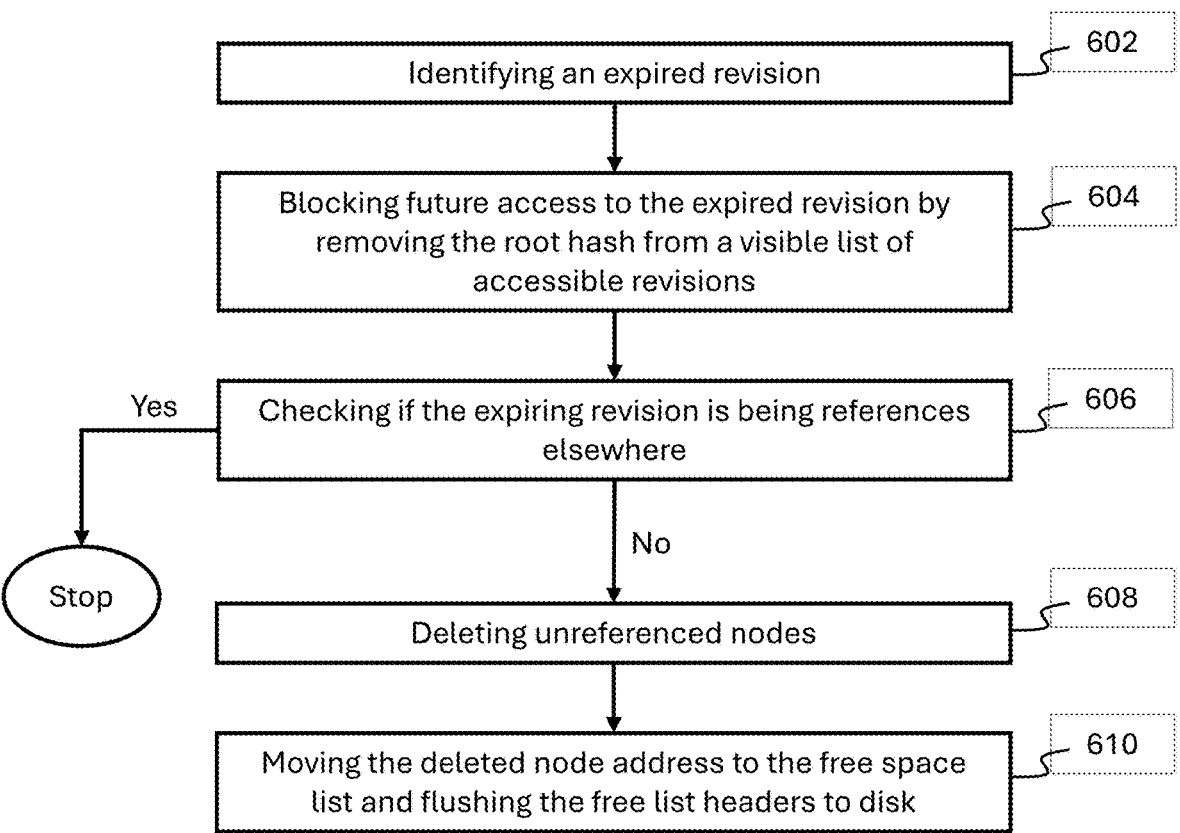
FIG. 6 illustrates an exemplary workflow for a process for reaping an expired revision, according to certain aspects of the present disclosure.

FIG. 6 illustrates an exemplary workflow for a process 600 for reaping an expired revision. Process 600 may be performed at operation 510 during the commit process 500. According to some embodiments, process 600 may be implemented when an oldest revision is no longer needed.

At operation 602, process 600 may include identifying an expired revision.

At operation 604, process 600 may include blocking future access to the expired revision by removing the root hash from a visible list of accessible revisions.

At operation 606, process 600 may include checking if the expired revision is being references elsewhere (for example, in another file or another revision within a current file), indicating (YES at operation 606) there is concurrent access of the expired revision, then the revision cannot be reaped. Accordingly, the revision reaping process 600 stops. With reference to FIG. 500, a commit process may then continue, returning to operation 512. In some implementations, the database structure may keep a list of revisions that have expired and need reaping. From the list of revisions, the expired revisions may be deleted when they are no longer being referenced elsewhere. If there is no (NO at operation 606) concurrent access of the expired revision, the process 600 proceeds to operation 608.

At operation 608, process 600 may include deleting unreferenced nodes. According to some embodiments, this may delete all the nodes referred to by a child of the expired revision, and clear that list.

According to embodiments, a most recent revision is exempt from any delete operations making it impossible to delete the most recent revision. According to some embodiments, free list headers are not updated until all deletes have been performed, and the free list header writes must be forced to disk before the nodes in the proposal are flushed to disk (for example, at operation 516).

At operation 610, process 600 may include moving the deleted node address to the free space list and flushing the free list headers to disk, making the node addresses available for reallocation.

Figure 7:
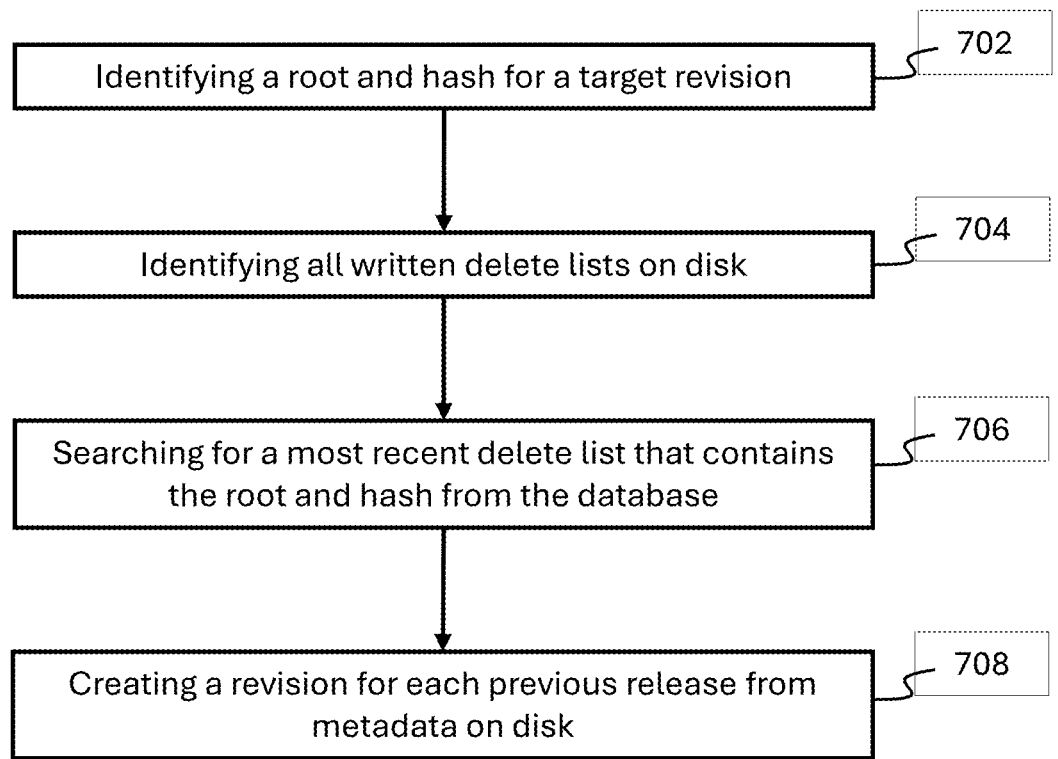
FIG. 7 illustrates an exemplary workflow for a process for recovering revisions of a database, according to certain aspects of the present disclosure.

FIG. 7 illustrates an exemplary workflow for a process 700 for recovering revisions of a database, according to one or more embodiments. Recovering database revisions is crucial, especially after unexpected events like crashes.

At operation 702, process 700 may include identifying a root and hash for a target revision that needs to be recovered.

At operation 704, process 700 may include identifying all written delete lists on disk. A future-delete log may include delete lists computed within every commit (for example, at operation 508) in the database.

At operation 706, process 700 may include searching for a most recent delete list that contains the root and hash from the database. This is the root hash the database will be restored to. This means that the database will recover up to the root update step (for example, operation 518) in the commit flow for a proposal.

At operation 708, process 700 may include creating a revision for each previous release from metadata on disk. This may include noting which deletions were listed as part of the commit. At this point, the database is considered recovered and older revisions (beginning from the target revision) are now available.

According to embodiments, the recovery process does not require Write-Ahead Logging (WAL) and can be done simply using the root address and root hash of a revision. The reason for this is that during each phase, the database on disk is left in a logically consistent state.

According to some embodiments, a database system may crash during a commit. If the database system crashes before the free list header is flushed to disk (for example, operation 514), then a list of deletable nodes may be present, but no hash or root node information. The deletable nodes may be discarded during recovery. If the database system crashes after the free list header is flushed to disk (for example, operation 514), then the space used by the committing proposal may be lost during recovery, but the database will be consistent and the list of deletable nodes may be present (again, without hash or root node information). If the database system crashes after the root address is flushed to disk (for example, operation 518), then the database is already consistent with this revision.

The techniques described herein may be implemented as method(s) (for example, process 500, 600, and 700) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

In some implementations, one or more operation blocks of FIGS. 5-7 may be performed by a processor circuit executing instructions stored in a memory circuit, in a client device, a remote server, or a database, communicatively coupled through a network (e.g., processors 212, memories 220, participant 110, participant 130, database(s) 152, and network 150). In some embodiments, one or more of the steps in process 500, 600, and 700 may be performed by one or more of the modules 908, 910, 912, 914, 916, 918, and/or 920 (as described in FIG. 9).

Although FIGS. 5-7 shows example blocks of process 500, 600, and 700, respectively, in some implementations, process 500, 600, and 700 may include additional blocks, fewer blocks, different blocks, or differently arranged blocks than those depicted in FIGS. 5-7. For explanatory purposes, the steps of the example process 500, 600, and 700 are described herein as occurring in serial, or linearly. However, multiple instances of the example process 500, 600, and 700 may occur in parallel, in a different order, simultaneously, quasi-simultaneously or overlapping in time.

Figure 8:
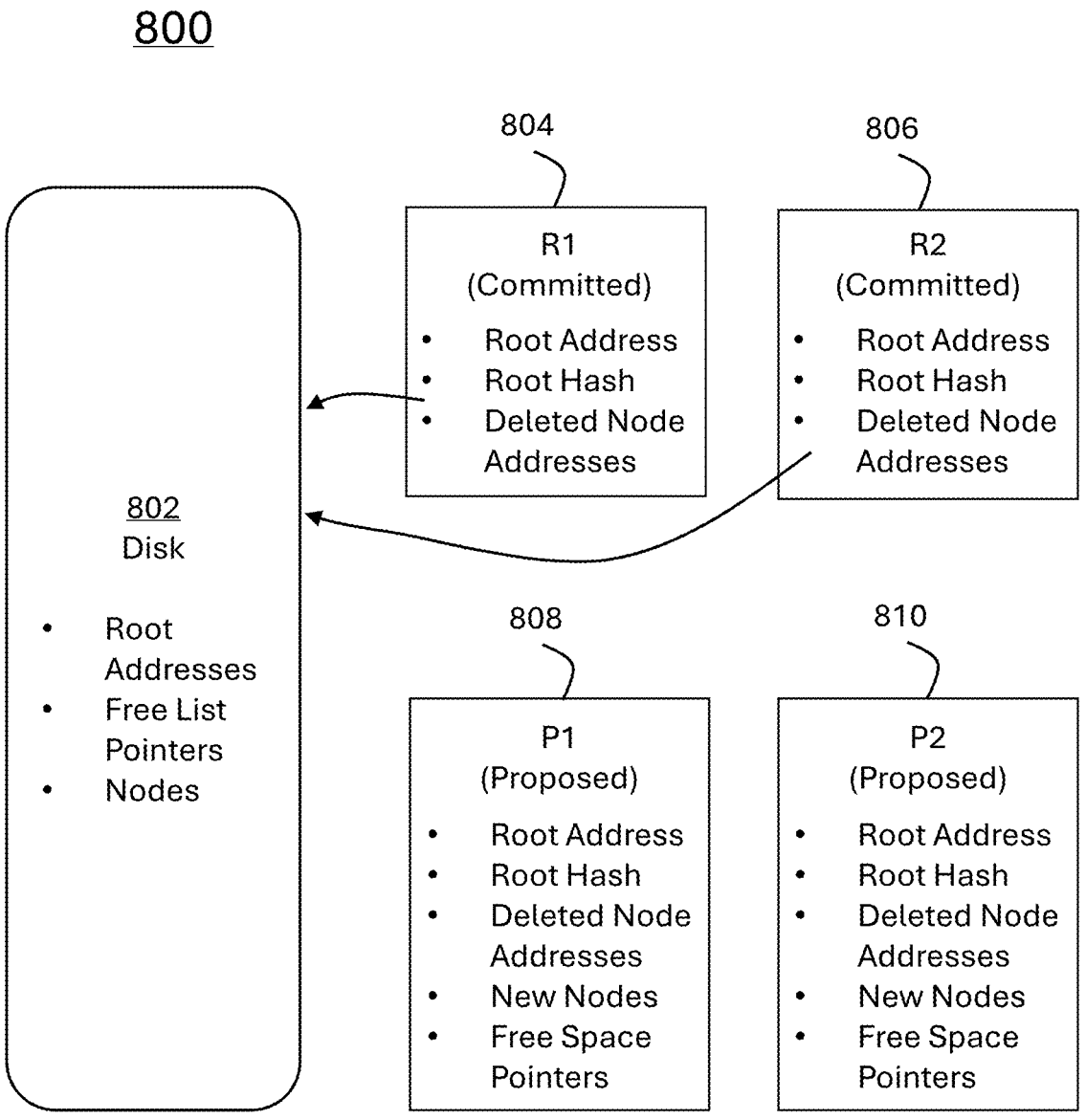
FIG. 8 is an overview diagram detailing aspects of a commit that may be stored on disk, according to certain aspects of the present disclosure.

FIG. 8 is an overview diagram 800 detailing aspects of a commit that may be stored on disk 802, according to one or more embodiments. Disk 802 will maintain a set of revisions including root addresses, free space pointers, and nodes.

As shown in FIG. 8, each committed revision such as, for example, revision 804 and revision 806, stores or flushes a root address, root hash, and deleted node addresses on disk. The deleted node addresses may be used to update the nodes on disk 802. For example, the nodes may be moved to a future-delete list tracking nodes that are no longer needed and scheduled for deletion. The disk 802 also keeps track of the free space pointers, for example, in a free space list, tracking available space that can be reused for new nodes. Free space pointers may be added for node addresses that are deleted from the future-delete list.

Proposed revisions such as, for example, proposal 808 and proposal 810, include new nodes and corresponding future-delete node addresses for the nodes that are being changed in the proposals, which are used to update the deleted node addresses on disk during a commit of the proposal. The proposed revisions also include free space pointers to spaces that will be used for committing the proposals. This will ensure that all free space freed by previously reaped proposals are used. Once proposal 808 and proposal 810 are committed, they are completely flushed to disk and can be referenced by the next revision.

Figure 9:
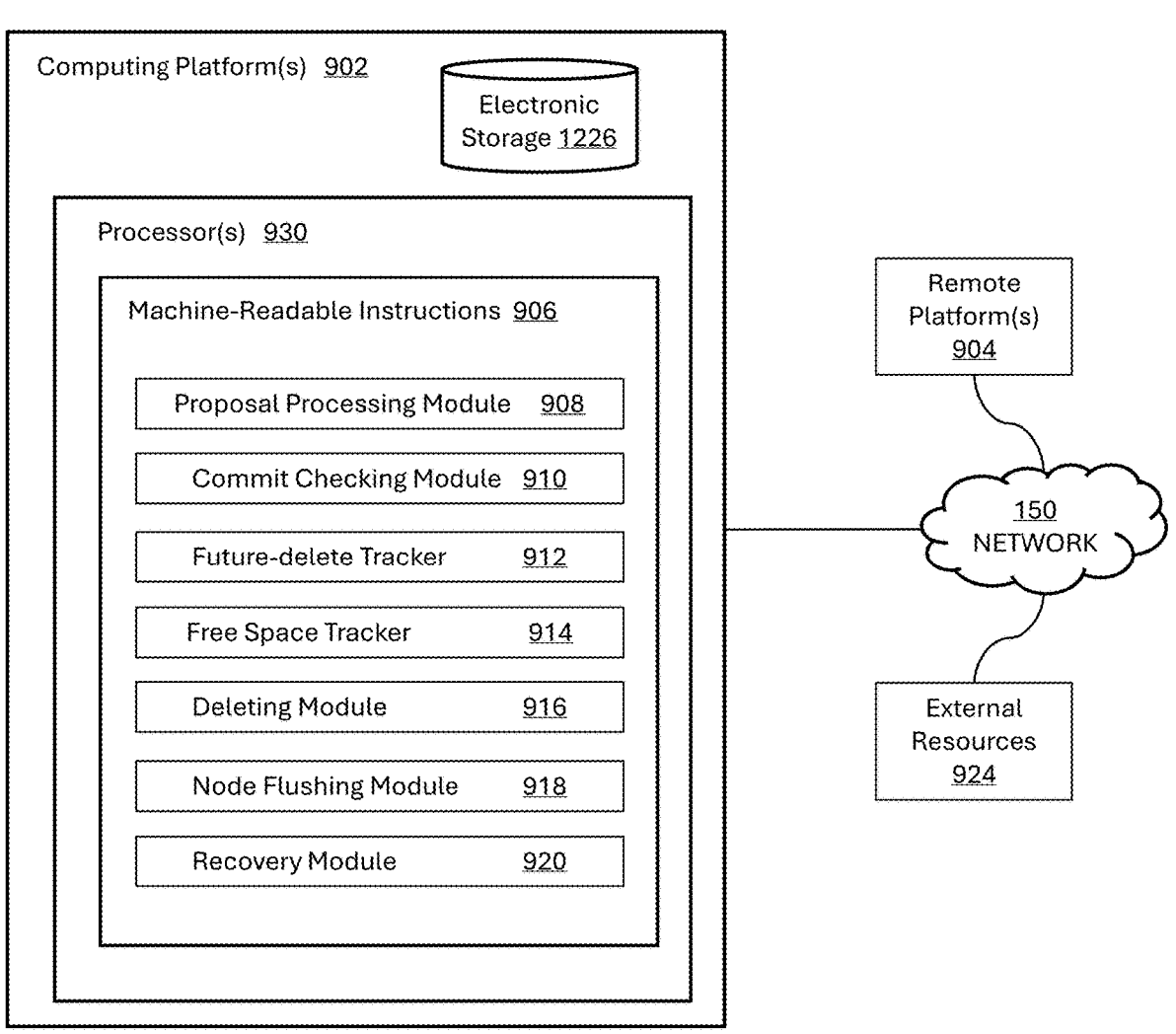
FIG. 9 is a block diagram illustrating a compaction-less database system implementing aspects of the subject technology, according to certain aspects of the present disclosure.

FIG. 9 is a block diagram illustrating a compaction-less database system 900 implementing aspects of the subject technology, according to one or more embodiments. According to some embodiments, compaction-less database system 900 may be implemented as a standalone blockchain. According to some embodiments, compaction-less database system 900 may be deployed on a blockchain or in a blockchain network that includes one or more blockchains or subnets. Users may interact with the blockchain(s) through web browsers by connecting their digital wallets to decentralized applications (dApps). These dApps may provide a user interface that allows users to deploy and interact with the blockchain(s). The blockchain network may leverage the compaction-less database system 900 to securely and efficiently store, update, and verify its state and transaction data.

According to some embodiments, compaction-less database system 900 may include one or more computing platforms 902 executing various aspects of the system. The computing platform(s) 902 can correspond to a server component of the blockchain platform, which can be similar to or the same as the computing device(s) of participants 130 of FIG. 1 and include the client computing device(s) of participants 110 of FIG. 1 and include the processors 212 in FIG. 2.

Computing platform(s) 902 may represent blockchain platforms, nodes, validators, minor computers, or the like. The computing platform(s) 902 may be configured to communicate with one or more remote platform(s) 904 according to a client/server architecture, a peer-to-peer architecture, and/or other architectures. The remote platform(s) 904 may be configured to communicate with other remote platforms via computing platform(s) 902 and/or according to a client/server architecture, a peer-to-peer architecture, and/or other architectures. The remote platform(s) 904 can be configured to cause output of the system 900 on client device(s) of the remote platform(s) 904 with enabled access (e.g., based on analysis by the computing platform(s) 902) according to stored data. Any external blockchain platform built based on a platform/metadata chain of the computing platform(s) 902 that relies on the primary blockchain may also realize the benefits of the transfer protocols, according to embodiments. In this way, the platform chain, primary network, and other entities of the blockchain platform may communicate with the computing platform(s) 902. The computing platform(s) 902, external resources 924, and remote platform(s) 904 may be in communication with and/or mutually accessible via network 150.

The computing platform(s) 902 may be configured by machine-readable instructions 906. The machine-readable instructions 906 may be executed by the computing platform(s) to implement one or more instruction modules. The instruction modules may include computer program modules. The instruction modules being implemented may include one or more of a proposal processing module 908, commit checking module 910, future-delete tracker 912, free space tracker 914, deleting module 916, node flushing module 918, and recovery module 920.

The proposal processing module 908 may be configured to receive a proposal for a state update including a set of changes or updates to the database structure. The proposal may include at least a root hash (corresponding to a root node) representing the set of changes and an ordered set of operations based on the set of changes. The set of changes may include one or multiple node value changes. That is, the proposal may include at least one or more updated nodes from a parent proposal. The proposal processing module 908 may then initiate a commit for the proposal.

The commit checking module 910 may be configured to verify that the proposal's parent is the last committed revision. In order to ensure that data is accurately used between a latest revision and a current proposal for a new revision, the parent must be the latest committed revision. If the proposal's parent is not the last committed revision, the commit will fail.

The future-delete tracker 912 may be configured to track a list of nodes that are no longer needed. The list of nodes may comprise node addresses that are fully flushed to disk, ensuring that all nodes slated for deletion are recorded and can be recovered. A node may not be considered to be needed if, for example, its associated revision has expired or the node is no longer referenced in the current revision. According to some embodiments, the future-delete tracker 912 may mark nodes from the proposal that have changed for deletion and have been added to the list of nodes (referred to as "future-delete log"). As such, even though the nodes are not referenced by the proposal, they may still be recovered on disk.

According to some embodiments, the future-delete tracker 912 may be configured to determine when a revision and nodes in the revision have expired and can be deleted. According to some embodiments, the future-delete tracker 912 may maintain a configurable number of previous revisions of the data structure on-disk. In some implementations, an oldest revision stored on disk and included in the list of nodes may be deleted after N revisions are committed.

The free space tracker 914 may be configured to track a list of node headers and/or pointers (referred to as "free space list") for available and reusable space on-disk. The free space list may be flushed to disk during every commit. According to some embodiments, the free space list is first referenced during a commit and any available space is used prior to overwriting and/or deleting nodes.

The deleting module 916 may be configured to delete revisions/nodes once they have expired. To delete a revision, the deleting module 916 may block future access to the revision by removing the root from the future-delete list. The deleting module 916 may be configured to check if the expired revision is being references elsewhere to ensure that there is no concurrent access of the expired revision before it is deleted. Based on a determination, that there is no concurrent access, the nodes from the revision may be deleted. The deleting module 916 may flush deleted node addresses to free space list. According to some embodiments, the deleting module 916 may be configured to determine whether a node is actively being accessed (for example, a transaction is being verified or accessed by a user). The deleting module 916 may be configured to defer deletion of expired nodes based on a determination that specific data within the nodes are being accessed.

The node flushing module 918 may be configured to write new nodes (node values) to disk based on a proposal. In some embodiments, the node flushing module 918 may be configured to overwrite node addresses scheduled for deletion (by future-delete tracker 912), replacing the space storing an old node (whose value has changed) with the new value. Node values include hashes of key-value pairs. According to some embodiments, the node flushing module 918 may be further configured to flush a root address from the proposal to disk, replacing the root node of the most recent revision with the root node in the proposal.

The recovery module 920 may be configured to recover revisions using their root hash. The recovery module 920 may search the future-delete list for the root hash and recover all revisions up to that revision, creating a revision for each previous release from metadata stored on disk. This may include noting which deletions were listed as part of the commit for the root hash.

In some implementations, the computing platform(s) 902, the remote platform(s) 904, and/or the external resources 924 may be operatively linked via one or more electronic communication links. For example, such electronic communication links may be established, at least in part, via network 150 such as the Internet and/or other networks. It will be appreciated that this is not intended to be limiting, and that the scope of this disclosure includes implementations in which the computing platform(s) 902, the remote platform(s) 904, and/or the external resources 924 may be operatively linked via some other communication media.

A given remote platform 904 may include client computing devices, which may each include one or more processors configured to execute computer program modules. The computer program modules may be configured to enable an expert or user associated with the given remote platform 904 to interface with the system 900 and/or external resources 924, and/or provide other functionality attributed herein to remote platform(s) 904. By way of non-limiting example, a given remote platform 904 and/or a given computing platform 902 may include one or more of a server, a desktop computer, a laptop computer, a handheld computer, a tablet computing platform, a NetBook, a Smartphone, a gaming console, and/or other computing platforms. External resources 924 may include sources of information outside of the system 900, external entities participating with the system 900, and/or other resources. For example, the external resources 924 may include externally designed blockchain elements and/or applications designed by third parties. In some implementations, some or all of the functionality attributed herein to the external resources 924 may be provided by resources included in system 900.

Computing platform(s) 902 may include electronic storage 926, a processor such as the processors 212, and/or other components. The computing platform(s) 902 may include communication lines, or ports to enable the exchange of information with a network and/or other computing platforms. Illustration of the computing platform(s) 902 in FIG. 9 is not intended to be limiting. The computing platform(s) 902 may include a plurality of hardware, software, and/or firmware components operating together to provide the functionality attributed herein to the computing platform(s) 902. For example, the computing platform(s) 902 may be implemented by a cloud of computing platforms operating together as the computing platform(s) 902.

Electronic storage 926 may include non-transitory storage media that electronically stores information. The electronic storage media of the electronic storage 926 may include one or both of system storage that is provided integrally (i.e., substantially non-removable) with computing platform(s) 902 and/or removable storage that is removably connectable to computing platform(s) 902 via, for example, a port (e.g., a USB port, a firewire port, etc.) or a drive (e.g., a disk drive, etc.). Electronic storage 926 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 926 may include one or more virtual storage resources (e.g., cloud storage, a virtual private network, and/or other virtual storage resources). Electronic storage 926 may store software algorithms, information determined by the processors 212, information received from computing platform(s) 902, information received from the remote platform(s) 904, and/or other information that enables the computing platform(s) 902 to function as described herein.

Processor(s) 930 may be configured to provide information processing capabilities in computing platform(s) 902. As such, processor(s) 930 may include one or more of a digital processor, an analog processor, a digital circuit designed to process information, an analog circuit designed to process information, a state machine, and/or other mechanisms for electronically processing information. Although processor(s) 930 is shown in FIG. 9 as a single entity, this is for illustrative purposes only. In some implementations, processor(s) 930 may include a plurality of processing units. These processing units may be physically located within the same device, or processor(s) 930 may represent processing functionality of a plurality of devices operating in coordination. Processor(s) 930 may be configured to execute modules 908, 910, 912, 914, 916, 918, and/or 920, and/or other modules. Processor(s) 930 may be configured to execute modules 908, 910, 912, 914, 916, 918, and/or 920, and/or other modules by software; hardware; firmware; some combination of software, hardware, and/or firmware; and/or other mechanisms for configuring processing capabilities on processor(s) 930. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 908, 910, 912, 914, 916, 918, and/or 920 are illustrated in FIG. 9 as being implemented within a single processing unit, in implementations in which processor(s) 930 includes multiple processing units, one or more of modules 908, 910, 912, 914, 916, 918, and/or 920 may be implemented remotely from the other modules. The description of the functionality provided by the different modules 908, 910, 912, 914, 916, 918, and/or 920 described below is for illustrative purposes, and is not intended to be limiting, as any of modules 908, 910, 912, 914, 916, 918, and/or 920 may provide more or less functionality than is described. For example, one or more of modules 908, 910, 912, 914, 916, 918, and/or 920 may be eliminated, and some or all of its functionality may be provided by other ones of modules 908, 910, 912, 914, 916, 918, and/or 920. As another example, processor(s) 930 may be configured to execute one or more additional modules that may perform some or all of the functionality attributed below to one of modules 908, 910, 912, 914, 916, 918, and/or 920.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Hardware Overview

Figure 10:
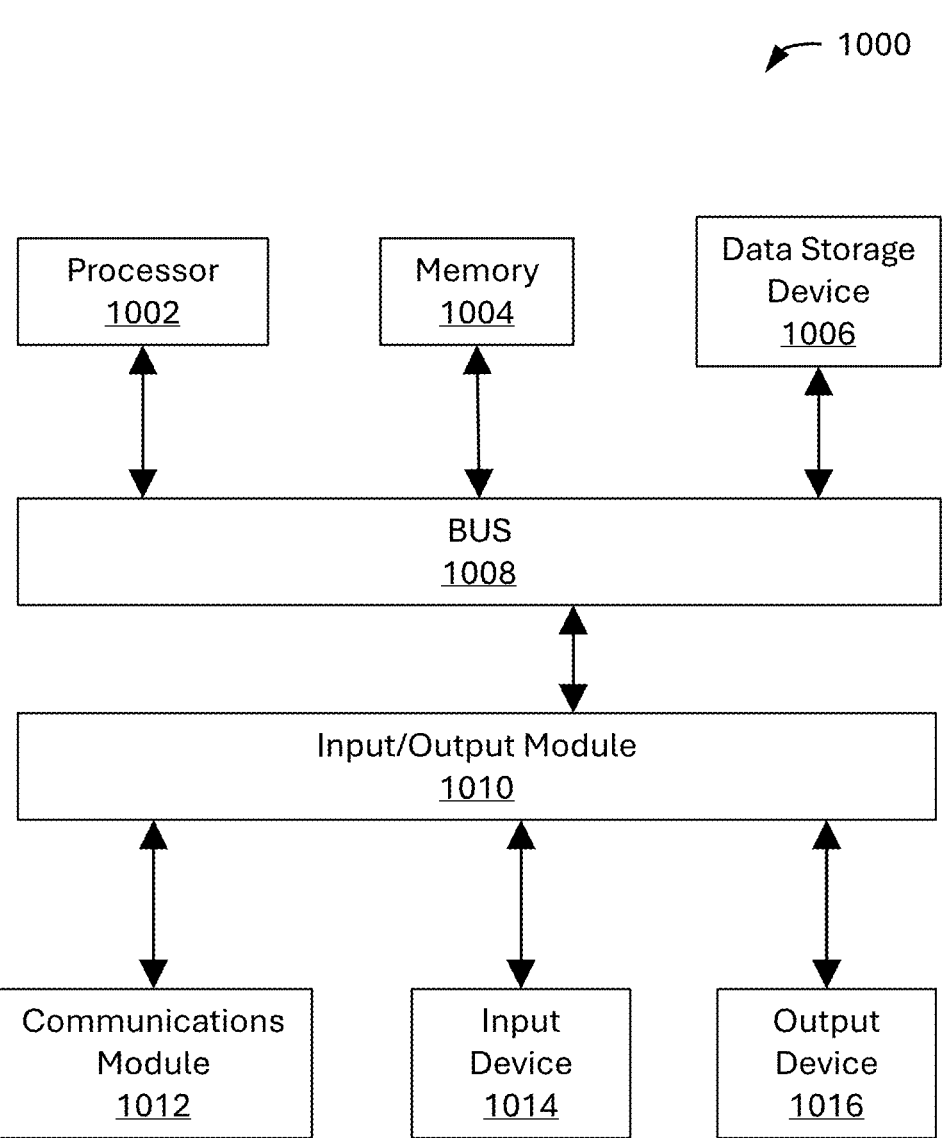
FIG. 10 is a block diagram illustrating an example computer system with which aspects of the subject technology can be implemented.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities.

The computer system 1000 (e.g., server and/or participant) includes a bus 1008 or other communication mechanism for communicating information, and a processor 1002 (e.g., processors 212) coupled with the bus 1008 for processing information. By way of example, the computer system 1000 may be implemented with one or more processors 1002. Each of the one or more processors 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. Processor 1002 and memory 1004 can be supplemented by, or incorporated in, special purpose logic circuitry.

The instructions may be stored in memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by the processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 1000 further includes a data storage device 1006 such as a magnetic disk or optical disk, coupled to bus 1008 for storing information and instructions. The computer system 1000 may be coupled via input/output module 1010 to various devices. The input/output module 1010 can be any input/output module. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described systems can be implemented using a computer system 1000 in response to the processor 1002 executing one or more sequences of one or more instructions contained in the memory 1004. Such instructions may be read into memory 1004 from another machine-readable medium, such as data storage device 1006. Execution of the sequences of instructions contained in the main memory 1004 causes the processor 1002 to perform the process steps described herein. One or more processors in a multi-processing arrangement may also be employed to execute the sequences of instructions contained in the memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 1000 can include clients and servers. A client and server are generally remote from each other and typically interact through a communication network. The relationship of client and server arises by virtue of computer programs running on the respective computers and having a client-server relationship with each other. The computer system 1000 can be, for example, and without limitation, a desktop computer, laptop computer, or tablet computer. The computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 1002 for execution. Such a medium may take many forms, including, but not limited to, non-volatile media, volatile media, and transmission media. Non-volatile media include, for example, optical or magnetic disks, such as the data storage device 1006. Volatile media include dynamic memory, such as the memory 1004. Transmission media include coaxial cables, copper wire, and fiber optics, including the wires that comprise the bus 1008. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra-density optical discs, any other optical or magnetic media, and floppy disks. In one or more embodiments, the computer-readable media does not include carrier waves and electronic signals passing wirelessly or over wired connections, or any other ephemeral signals. For example, the computer-readable media may be entirely restricted to tangible, physical objects that store information in a form that is readable by a computer. In some embodiments, the computer-readable media is non-transitory computer-readable media, or non-transitory computer-readable storage media.

In one or more embodiments, a computer program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. While the above discussion primarily refers to microprocessor or multi-core processors that execute software, one or more embodiments are performed by one or more integrated circuits, such as application specific integrated circuits (ASICs) or field programmable gate arrays (FPGAs). In one or more embodiments, such integrated circuits execute instructions that are stored on the circuit itself.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize user privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the user's privacy settings or preferences. It should also be understood that the original applicant intends that the systems and methods described herein, if implemented or used by other entities, be in compliance with privacy policies and practices that are consistent with its objective to respect the user's privacy.

What is claimed is:

1. A computer-implemented method, the method comprising:
    receiving a proposal for a revision including a root hash reflecting one or more node changes in a database structure;
    identifying nodes in a most recent revision of the database structure stored on disk corresponding to locations of the node changes;
    persisting disk addresses for the identified nodes in the most recent revision to a future-delete list on disk;
    flushing to disk a root node based on the root hash and new nodes representing the node changes;
    updating, on disk, a root address based on the root node;
    overwriting disk addresses of expired nodes identified in a free space list with disk addresses of the new nodes, wherein free space from previously reaped revisions are reused to store new nodes before allocating new space on disk or deleting nodes from the future-delete list; and
    committing the proposal as a new revision of the database structure.

2. The computer-implemented method of claim 1, wherein the database structure corresponds to a Merkle trie and the nodes of the Merkle trie store key-value pairs.

3. The computer-implemented method of claim 1, further comprising flushing a free space list comprising free space headers that identify available disk addresses for storing the new nodes representing the node changes on disk, wherein free space from previously reaped revisions are reused to store new nodes before allocating new space on disk.

4. The computer-implemented method of claim 1, further comprising overwriting values of the nodes in the most recent revision with new values corresponding to the node changes.

5. The computer-implemented method of claim 1, wherein the future-delete list contains addresses of changed nodes scheduled for deletion and the future-delete list is maintained on disk.

6. The computer-implemented method of claim 1, further comprising maintaining a configurable number of previous revisions of the database structure on-disk.

7. The computer-implemented method of claim 1, further comprising:
    deleting an oldest revision from the future-delete list after N revisions are committed; and
    adding space headers pointing to deleted node addresses from the oldest revision to a free space list.

8. The computer-implemented method of claim 1, further comprising:

checking a free space list for available space on disk;

flushing the root node and/or the new nodes based on available node addresses included in the free space list; and allocating new space for the proposal on disk based on the free space list being empty, wherein the root node and/or the new nodes are written to disk at the new space.

9. The computer-implemented method of claim 1, further comprising recovering revisions from disk using root addresses stored in memory.

10. The computer-implemented method of claim 1, wherein nodes are scheduled for deletion by being moved to the future-delete list, and the nodes are referenceable in a current revision so long as they have not been deleted.

11. A system comprising:

one or more processors; and a memory comprising instructions stored thereon, which when executed by the one or more processors, causes the one or more processors to:

receive a proposal for a revision including a root hash reflecting one or more node changes in a database structure;

identify nodes in a most recent revision of the database structure stored on disk corresponding to locations of the node changes;

persist disk addresses for the identified nodes in the most recent revision to a future-delete list on disk;

flush to disk a root node based on the root hash and new nodes representing the node changes to disk;

update, on disk, a root address based on the root node;

overwrite disk addresses of expired nodes identified in a free space list with disk addresses of the new nodes, wherein free space from previously reaped revisions are reused to store new nodes before allocating new space on disk or deleting nodes from the future-delete list; and commit the proposal as a new revision of the database structure.

12. The system of claim 11, wherein the database structure corresponds to a Merkle trie and the nodes of the Merkle trie store key-value pairs.

13. The system of claim 11, wherein the instructions, when executed by at least one of the one or more processors, further causes the system to flush a free space list comprising free space headers that identify available disk addresses for storing the new nodes representing the node changes on disk.

14. The system of claim 11, wherein the instructions, when executed by at least one of the one or more processors, further causes the system to overwrite values of the nodes in the most recent revision with new values corresponding to the node changes.

15. The system of claim 11, wherein the future-delete list contains addresses of changed nodes scheduled for deletion and the future-delete list is maintained on disk.

16. The system of claim 11, wherein the instructions, when executed by at least one of the one or more processors, further causes the system to maintain a configurable number of previous revisions of the database structure on-disk.

17. The system of claim 11, wherein the instructions, when executed by at least one of the one or more processors, further causes the system to:

delete an oldest revision from the future-delete list after N revisions are committed; and add space headers pointing to deleted node addresses from the oldest revision to a free space list.

18. The system of claim 11, wherein the instructions, when executed by at least one of the one or more processors, further causes the system to:

check a free space list for available space on disk;

flush the root node and/or the new nodes based on available node addresses included in the free space list; and allocate new space for the proposal on disk based on the free space list being empty, wherein the root node and/or the new nodes are written to disk at the new space.

19. The system of claim 11, wherein the instructions, when executed by at least one of the one or more processors, further causes the system to recover revisions from disk using root addresses stored in memory.

20. A non-transitory computer-readable medium storing a program, which when executed by a computer, configures the computer to perform:

receiving a proposal for a revision including a root hash reflecting one or more node changes in a database structure;

identifying nodes in a most recent revision of the database structure stored on disk corresponding to locations of the node changes;

persisting disk addresses for the identified nodes in the most recent revision to a future-delete list on disk;

flushing to disk a root node based on the root hash and new nodes representing the node changes;

updating, on disk, a root address based on the root node;

overwriting disk addresses of expired nodes identified in a free space list with disk addresses of the new nodes, wherein free space from previously reaped revisions are reused to store new nodes before allocating new space on disk or deleting nodes from the future-delete list; and committing the proposal as a new revision of the database structure.

* * * * *